Feb. 14, 1939.  F. W. MOORE  2,147,309
FLOW INDICATING DEVICE
Filed Sept. 13, 1937
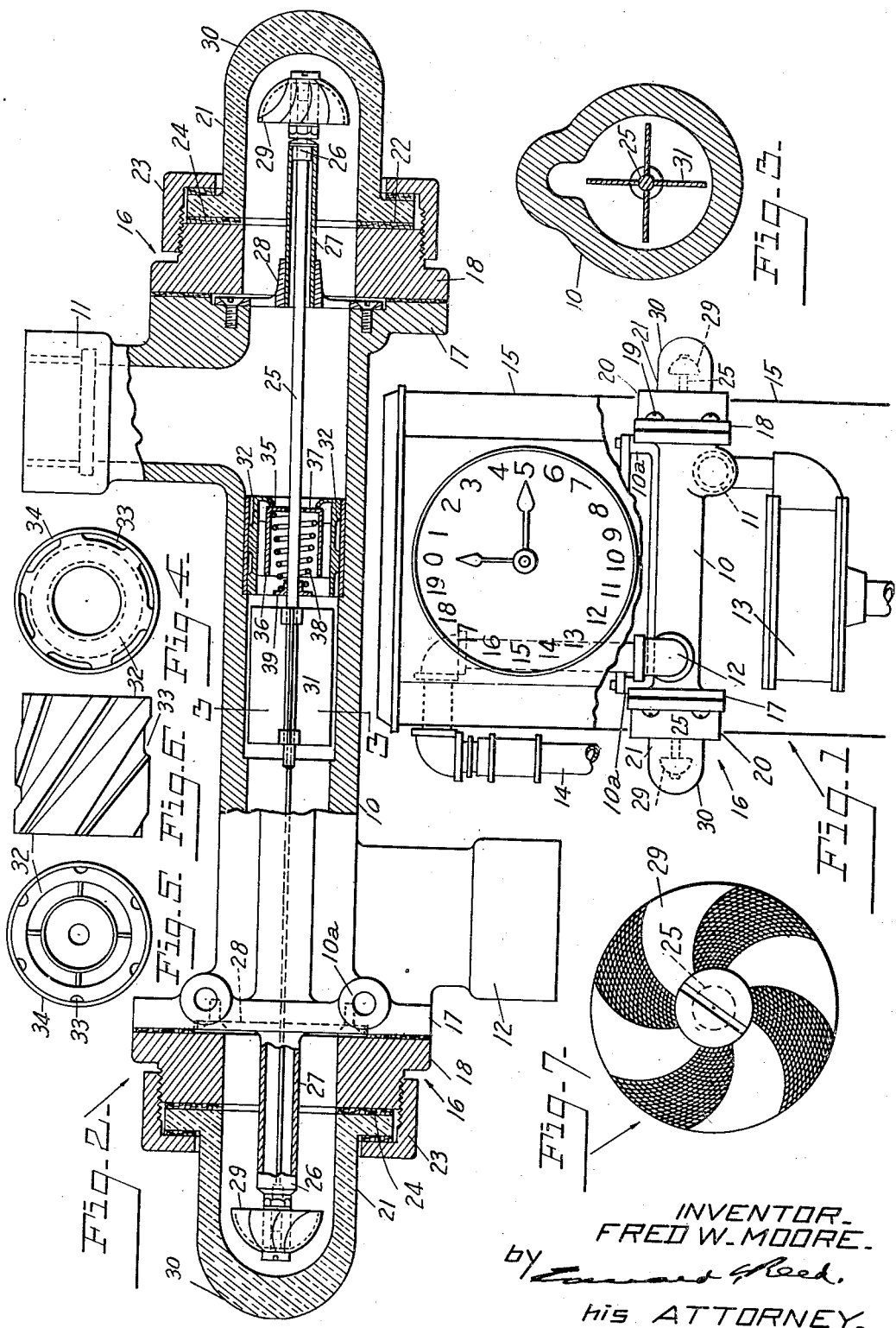
INVENTOR.
FRED W. MOORE.
by Edward G. Reed
his ATTORNEY.

Patented Feb. 14, 1939

2,147,309

UNITED STATES PATENT OFFICE 2,147,309

FLOW INDICATING DEVICE

Fred W. Moore, Dayton, Ohio, assignor to National Pumps Corporation, Dayton, Ohio, a corporation of Ohio Application September 13, 1937, Serial No. 163,615

10 Claims. (Cl. 116—117)

This invention relates to a flow indicating device and more particularly to that type of indicating device used in connection with gasoline pumps and commonly called a spinner. In flow indicators of this type as heretofore used the rotation of the indicating member was in direct proportion to the flow of fluid through the discharge line and a slow flow of fluid would impart little or no motion to the indicating member while a large flow would cause the indicating member to rotate so rapidly that an observer would have difficulty in determining whether it was in motion or stationary unless he had previously noted the exact characteristics thereof.

One object of the present invention is to provide a flow indicator in which the indicating member will rotate at a substantially uniform speed regardless of the total amount of flow of the fluid through the discharge line so long as said total amount does not decrease below a predetermined minimum quantity.

To this end it is a further object of the invention to provide such a flow indicator with means for automatically controlling the action of the fluid on the device which rotates the indicating member.

A further object of the invention is to provide such a flow indicator in which all moving parts will be enclosed and the use of stuffing boxes avoided.

A further object of the invention is to provide a flow indicator with means for magnifying the indicating member as it appears to the observer.

Other objects of the invention may appear as the apparatus is described in detail.

In the accompanying drawing Fig. 1 is an elevation of a portion of the gasoline pump, partly in section, and showing the flow indicator installed therein; Fig. 2 is a horizontal sectional view, partly in plan, of a flow indicator embodying my invention; Fig. 3 is a section taken on the line 3—3 of Fig. 2; Fig. 4 is an elevation of the inlet end of the controlling device; Fig. 5 is an elevation of the discharge end of the controlling device; Fig. 6 is a plan view of that member of the controlling device having passageways; and Fig. 7 is an end view of the indicating member.

In the drawing I have illustrated one embodiment of my invention and have shown the same as applied to a gasoline pump of a known construction and as having indicators arranged on opposite sides of that pump. It will be understood, however, that this embodiment has been chosen for the purposes of illustration only and that the device may take various forms and may be provided with one or more indicators as desired.

In that embodiment of the invention here illustrated the device comprises two indicators located at opposite sides of the cabinet of the pump and enclosed in hollow structures having transparent portions through which the indicating members can be observed. These indicating members are actuated by a shaft which extends through a portion of the discharge line of the gasoline pump and is provided with fluid actuated means, such as vanes, for rotating the same, and a controlling device is arranged in advance of the fluid actuated device to control the action of the fluid thereon in such a manner as to cause the shaft and indicating members to rotate at a substantially uniform speed regardless of the total amount of fluid flowing through the discharge line.

As here shown that portion of the discharge line in which the device is mounted comprises a substantially horizontal conduit 10 arranged within the pump cabinet 15 and provided near its respective ends with an inlet 11 and an outlet 12 adapted to be connected in the discharge line, preferably between the meter 13 and the discharge hose 14. This conduit is open at its ends and is secured to and in open communication with hollow structures, which extend beyond the cabinet and constitute extensions of the conduit and provide chambers in which the indicating members are located. In the present construction each hollow structure comprises a collar 16 secured to the adjacent end of the conduit, the conduit and the collar being provided with opposed flanges 17 and 18 respectively, which are connected one to the other by screws 19. Secured to the collar 16 is a dome-shaped element 21, preferably of glass, and, as here shown, provided with a flange 22 which is secured to the collar 16 by a flanged clamping collar 23, a suitable gasket 24 being interposed between the glass element and the collar 16 to provide a fluid tight joint. The conduit may be mounted in any suitable manner and, as shown, is provided with lugs 10a to receive attaching screws by which it is secured to the frame, and the cabinet walls are provided with openings 20 through which the extensions project.

A shaft 25 extends lengthwise through the conduit 10 and into the hollow structures at the respective ends of that conduit and has its end portions journaled in suitable bearings 26 which are preferably supported within the hollow structures. It is desirable to support the shaft near the ends thereof and, in the construction illustrated, each bearing is carried by a tubular member 27 which is supported at its inner end by a spider 28 rigidly secured to the adjacent end of the conduit 10 and through which the shaft extends. An indicating member 29 is mounted in each hollow structure and is connected with the shaft for rotation thereby. Preferably the shaft extends beyond its bearing and the indicating member is mounted on the projecting end thereof. The indicating member may be of any suitable character and it is here shown as a hollow substantially semi-spherical member having its closed side outermost. The outer surface of this member is preferably provided with suitable markings, such as the stripes shown in Fig. 7, to enable its movement to be easily observed. In the present arrangement the dome-shaped outer end of the glass portion 21 of the hollow structure is shaped to form a magnifying lens, as shown at 30, and this lens, together with the liquid between the same and the indicating member, serves to magnify the indicating member and its markings so as to facilitate their observation.

Arranged within the conduit 10 is a suitable fluid actuated device for imparting rotation to the shaft 25, this device preferably comprising a series of vanes 31 secured to the shaft and, in the present instance, extending radially therefrom and parallel one with the other and with the shaft. Interposed in the conduit 10 between the fluid actuated device and the inlet 11, that is, in advance of the vanes 31, is a device for so controlling the action of the fluid on the vanes that the shaft and indicating members will be rotated at a substantially uniform speed regardless of the flow of fluid through the conduit. This controlling device is preferably cylindrical in form and is provided in its outer circumferential portion with a series of passageways extending lengthwise of the conduit. In the arrangement shown the cylindrical device comprises a hollow shell 32 provided in its outer surface with grooves 33 and when this device is installed the outer sides of these grooves are closed so that the passageways are open at their ends only. Preferably an outer shell 34 is fitted about the shell 32 to close the outer sides of the grooves but obviously if the shell 32 was fitted into the conduit the wall of the conduit would close the outer sides of the grooves. These passageways extend obliquely to the shaft 25 and preferably taper from their inlet ends to the discharge ends thereof so that the fluid passing through the passageways is discharged in the form of relatively small jets against the rear faces of the vanes 31 and at an acute angle thereto, thus imparting rotation to the vanes and shaft. Pressure controlled means are provided for controlling the flow of fluid through the interior of the shell 32 and for that purpose the shell is provided at its inlet end with a valve seat which may conveniently be formed by a circumferential flange 35 on the shell. Mounted within the shell 32 is a valve member 36 which is arranged about and moves lengthwise of the shaft 25 into and out of engagement with the valve seat 35. As here shown, this valve member is cylindrical in form and has its forward end closed by an end wall 37, except for the opening through which the shaft extends. A spring 38 confined between the end wall 37 of the valve and a cross bar or spider 39 at the outlet end of the shell tends to move the valve toward its seat. This spring is of such strength that under no flow or low flow conditions the valve will be closed and all the fluid will pass through the outer series of passageways 33 and act on the vanes 31. As the flow of fluid increases the pressure on the valve will open the same sufficiently to permit that portion of the fluid in excess of the quantity that can pass through the passageways 33 to pass through the inner passageway in the shell 32. This inner passageway is parallel with the conduit, and the fluid is discharged therefrom parallel with the vanes 31 and will have little or no effect upon the rotation of those vanes. Thus it will appear that substantially a predetermined quantity of fluid passes through the outer series of passageways 33 and acts on the vanes under all conditions of flow and that that portion of the fluid in excess of said predetermined quantity will pass through the inner passageway of the controlling device and move past the vanes in inoperative relation thereto. While there may be some slight variation in the speed of rotation of the indicating members, due to low pressure when there is a very low flow of fluid through the conduit, the flow of fluid through the outer series of openings will cause the shaft and indicating members to rotate at a substantially uniform speed throughout the normal operation of the pump and this speed of rotation will be sufficiently slow to enable the markings on the indicating members to be readily distinguished.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a flow indicator for a fluid dispensing apparatus, a discharge conduit, a rotatable indicating member, a fluid actuated device in said conduit connected with said indicating member to rotate the latter, and a controlling device having means to cause substantially a predetermined quantity of fluid to act on said fluid actuated device so long as the total quantity of fluid flowing through said conduit is not less than a predetermined minimum quantity and to cause fluid in excess of said predetermined quantity to flow through said conduit and past said fluid actuated device in inoperative relation to the latter.

2. In a flow indicator for a fluid dispensing apparatus, a discharge conduit, a rotatable indicating member, fluid actuated means in said conduit connected with said indicating member to rotate the latter, and a pressure controlled device mounted in said conduit in advance of said fluid actuated means and having means to cause a substantially uniform quantity of fluid to act on said fluid actuated means regardless of the total amount of fluid flowing through said conduit so long as the total quantity of fluid flowing through said conduit is not less than a predetermined minimum quantity.

3. In a flow indicator for a fluid dispensing apparatus having a discharge conduit, a rotatable indicating member, fluid actuated means in said conduit connected with said indicating member to rotate the latter, and a device mounted in said conduit and having a passageway arranged to direct a portion of the fluid into operative relation to said fluid actuated device, a second passageway to direct another portion of said fluid past said fluid actuated means in inoperative relation thereto, and pressure controlled means to control the passage of fluid through said second passageway.

4. In a flow indicator for a fluid dispensing apparatus having a discharge conduit, a rotatable shaft in said conduit, an indicating member connected with said shaft for rotation thereby, fluid actuated vanes connected with said shaft to rotate the same, and a device arranged in advance of said vanes, said device being constructed and arranged to direct a portion of the fluid against said vanes at an angle thereto and to direct another portion of said fluid past said vanes in a direction substantially parallel therewith.

5. In a flow indicator for a fluid dispensing apparatus having a discharge conduit, a rotatable shaft in said conduit, an indicating member connected with said shaft for rotation thereby, fluid actuated vanes connected to and arranged substantially parallel with said shaft, a device mounted in said conduit in advance of said vanes and having a plurality of passageways, a part of which are arranged to discharge fluid against said vanes at an angle thereto and another part of which are arranged to discharge fluid substantially parallel with said vanes, and pressure controlled means to control the flow of fluid through the last mentioned part of said passageways.

6. In a flow indicator for a fluid dispensing apparatus having a discharge conduit, a rotatable shaft in said conduit, an indicating member connected with said shaft for rotation thereby, fluid actuated vanes connected with said shaft to rotate the same, and a cylindrical device mounted in said conduit in advance of said vanes, having in the outer portion thereof a series of relatively small oblique passageways and having in the inner portion thereof a relatively large passageway parallel with said vanes, and a pressure controlled valve to control the flow of fluid through the last mentioned passageway.

7. In a flow indicator for a fluid dispensing apparatus having a discharge conduit, a rotatable shaft in said conduit, an indicating member connected with said shaft for rotation thereby, fluid actuated vanes connected with said shaft to rotate the same, and a cylindrical device mounted in said conduit in advance of said vanes, having in the outer portion thereof a series of relatively small oblique passageways each of which tapers from its inlet end toward its discharge end, and having in the inner portion thereof a relatively large passageway parallel with said vanes, and a pressure controlled valve to control the flow of fluid through the last mentioned passageway.

8. In a fluid dispensing apparatus comprising a cabinet, and a discharge conduit within said cabinet, a hollow structure communicating with said conduit and having a transparent portion arranged exteriorly of said cabinet, a movable indicator in said hollow structure, a shaft mounted in said conduit and operatively connected with said indicator, a fluid actuated device mounted in said conduit and connected with said shaft to actuate the latter, and pressure controlled means to regulate the action of the fluid on said fluid actuated means.

9. In a fluid dispensing apparatus, a cabinet having an aperture in a wall thereof, a discharge line including a substantially horizontal conduit having in an end thereof an opening in line with the aperture in said wall, a hollow structure supported in line with said aperture, connected with said conduit and having a transparent portion arranged exteriorly of said cabinet, a bearing supported in said hollow structure, a shaft mounted in said bearing and extending into said conduit, an indicator connected with said shaft, fluid actuated means in said conduit for rotating said shaft and pressure controlled means in said conduit to regulate the action of fluid on said fluid actuated device.

10. In a flow indicator, a conduit having an inlet and an outlet adapted to be connected in the discharge line of a fluid dispensing apparatus and having an open end, a hollow structure having sealed connection with the open end of said conduit, having its outer end closed and having a transparent portion, a bearing supported in said structure, a shaft mounted in said conduit and having one end journaled in said bearing, an indicator connected with said shaft in said hollow structure, a fluid actuated device in said conduit for rotating said shaft, and means arranged between said inlet and said fluid actuated device to control the action of the fluid on said device.

FRED W. MOORE.